United States Patent
Asao

(10) Patent No.: US 6,469,408 B2
(45) Date of Patent: Oct. 22, 2002

(54) ALTERNATOR

(75) Inventor: Yoshihito Asao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/768,224

(22) Filed: Jan. 25, 2001

(65) Prior Publication Data

US 2002/0017823 A1 Feb. 14, 2002

(30) Foreign Application Priority Data

Jul. 31, 2000 (JP) ........................................ 2000-230814

(51) Int. Cl.7 ................................................ H02K 9/00
(52) U.S. Cl. ............................ 310/62; 310/59; 310/263
(58) Field of Search ............................... 310/52, 58, 59, 310/62, 63, 61, 263

(56) References Cited

U.S. PATENT DOCUMENTS

| | | | | |
|---|---|---|---|---|
| 3,230,404 A | * | 1/1966 | Graham | 310/263 |
| 3,829,720 A | | 8/1974 | Swanke et al. | 310/43 |
| 3,919,572 A | | 11/1975 | Desy | 310/45 |
| 4,654,551 A | * | 3/1987 | Farr | 310/112 |
| 5,325,003 A | * | 6/1994 | Saval et al. | 310/43 |
| 5,705,865 A | * | 1/1998 | Ishida et al. | 310/62 |
| 5,751,088 A | * | 5/1998 | Mukai et al. | 310/239 |
| 6,059,969 A | * | 5/2000 | Mizutani | 310/263 |
| 6,147,432 A | * | 11/2000 | Kusase et al. | 310/260 |
| 6,208,057 B1 | * | 3/2001 | Schultz et al. | 310/182 |
| 6,268,678 B1 | | 7/2001 | Asao et al. | 310/201 |

FOREIGN PATENT DOCUMENTS

| | | |
|---|---|---|
| EP | 0 671 801 A | 9/1995 |
| EP | 1 134 877 A | 9/2001 |
| JP | 2927288 | 5/1999 |
| JP | 11-164519 | 6/1999 |

OTHER PUBLICATIONS

Patent Abstracts of Japan, vol. 1995, No. 11, Dec. 26, 1995 & JP 07 222415 A (Mitsubishi Electric Corp), Aug. 18, 1995 *abstract*.
Patent Abstracts of Japan, vol. 009, No. 085 (E–308), Apr. 13, 1985 & JP 59 216452 A (Nippon Denso KK), Dec. 6, 1984 *abstract*.
Patent Abstracts of Japan, vol. 2000, No. 05, Sep. 14, 2000 & JP 2000 060051 A (Denso Corp), Feb. 25, 2000 *abstract*.
Patent Abstracts of Japan, vol. 1996, No. 02, Feb. 29, 1996 & JP 07 288941 A (Mitsubishi Electric Corp), Oct. 31, 1995 *abstract*.

* cited by examiner

Primary Examiner—Nestor Ramirez
Assistant Examiner—Dang Dinh Le
(74) Attorney, Agent, or Firm—Sughrue Mion, PLLC

(57) ABSTRACT

An automotive alternator which can realize high output and efficiency, and in which noise may be reduced includes: a polyphase stator winding 16 comprising a number of winding portions in which long wire strands 30 are wound so as to alternately occupy an inner layer and an outer layer in a slot 15a depth direction within the slots 15a at intervals of a predetermined number of slots 15a, the wire strands 30 folding back outside the slots 15a at axial end surfaces of a stator core 15 to form turn portions 30a; the turn portions 30a of the wire strands 30 being roughly the same shape and aligning at roughly the same pitch in a circumferential direction to constitute coil end groups 16a, 16b; the coil end groups 16a, 16b being disposed in a plurality of rows in the radial direction; fans 5 being provided at axial end portions of a rotor 7 roughly facing the coil end groups 16a, 16b and generating cooling air D flowing in a radial direction to ventilate the coil end groups 16a, 16b.

9 Claims, 19 Drawing Sheets

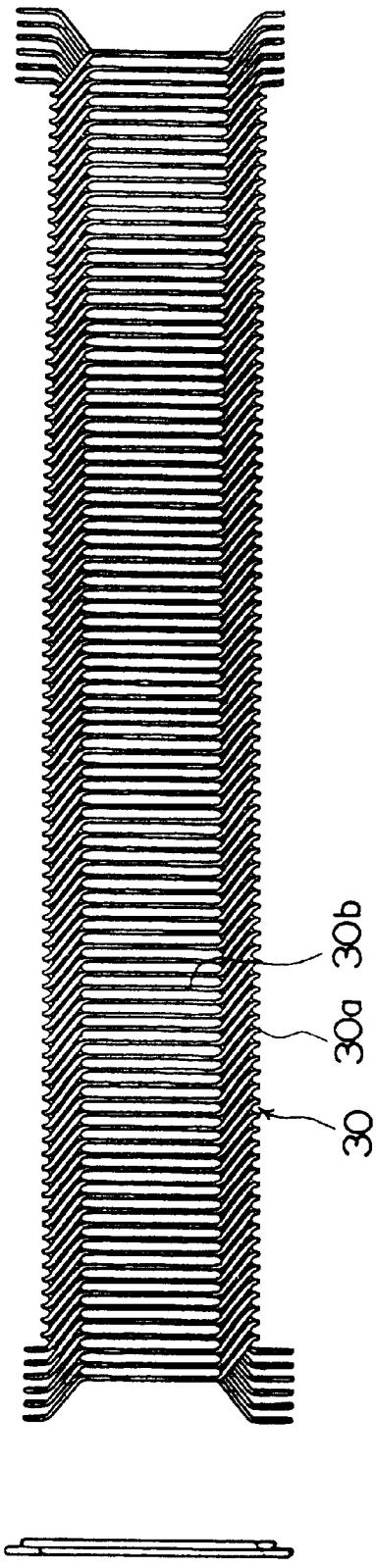

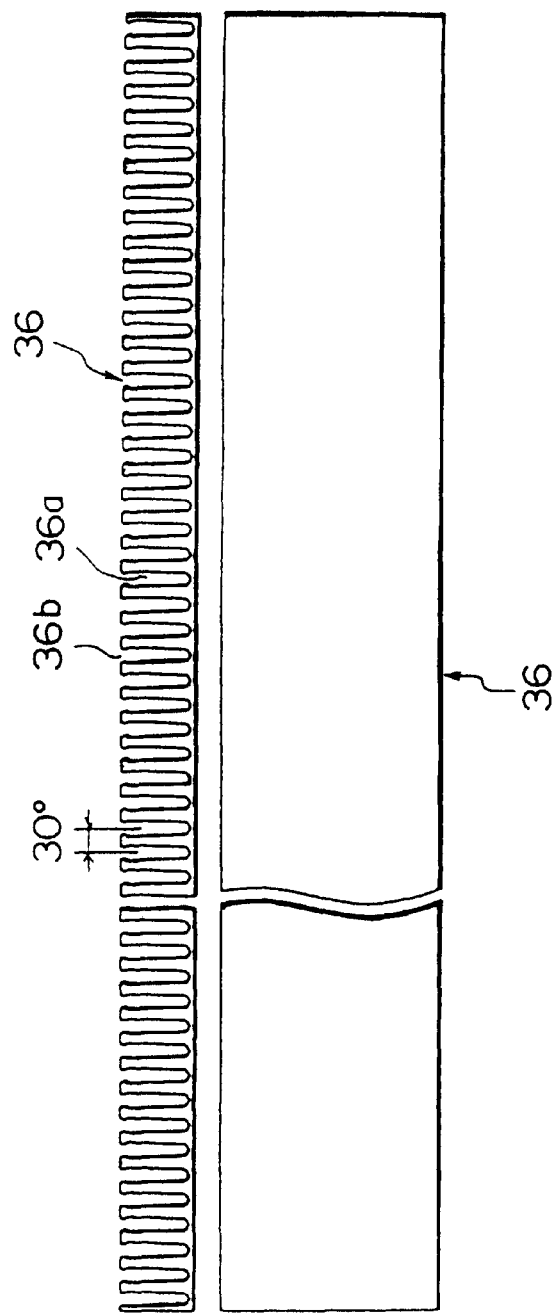

ALTERNATOR

BACKGROUND OF THE INVENTION

1. Field of the Invention

The present invention relates to an automotive alternator driven by an internal combustion engine and mounted to, for example, an automotive vehicle such as a passenger car or a truck, and in particular, relates to an automotive alternator which can realize high output and high efficiency and in which noise can be reduced.

2. Description of the Related Art

Generally, cooling ventilation is supplied to coil ends, which are heat producing portions, in order to realize compact high output in a dynamo-electric machine. Also, in order to suppress wind noise due to ventilation at this location, it is necessary to reduce the size of the coils ends which are a ventilation drag. Namely, it is necessary to improve the space, factor of electric conductors housed in the magnetic circuit of the stator and to line up and increase the density of bridge portions (bridge portions outside a stator core are called coil ends) of the stator winding.

Constructions aimed at increasing the space factor of the electrical conductors using short conductor segments for the electrical conductors in the stator and at lining up and increasing the density of the coil ends have been proposed in Japanese Patent Publication No. 2927288. However, since the stator winding taught in this publication is constructed from a plurality of short conductor segments, connecting welds are made. The existence of these welds limits the amount which the height of the coil ends may be reduced and is a source of interference.

On the other hand, Japanese Patent Laid-open No. Hei 11-164519 teaches shifting the height of the coil in the axial direction to increase the exposed surface area and thus improve the cooling performance of the coil end groups. However, with this construction, copper loss increases because the coil end height becomes larger, generated heat increases and the amount which the temperature may be lowered is limited even if the cooling performance is improved. Furthermore, since there is a large surface area exposed to cooling air flowing in a radial direction from a fan, the coil ends become a ventilation drag, pressure loss increases and noise worsens.

SUMMARY OF THE INVENTION

The present invention aims to solve the above problems with the conventional art and an object of the present invention is to provide an alternator which can realize high output and high efficiency and in which noise can be reduced.

According to one aspect of the present invention there is provided an automotive alternator including:

a rotor;

a stator including:
- a stator core disposed facing the rotor; and
- a polyphase stator winding installed in the stator core; and a bracket housing and supporting the rotor and the stator;

the stator core formed with a number of slots extending axially at a predetermined pitch in a circumferential direction, the polyphase stator winding including a number of winding portions in which long wire strands are wound so as to alternately occupy an inner layer and an outer layer in a slot depth direction within the slots at intervals of a predetermined number of slots, the wire strands folding back outside the slots at axial end surfaces of the stator core to form turn portions, and a plurality of the wire strands lining up in a row in a radial direction inside the slots of the stator core, the turn portions of the wire strands being roughly the same shape and aligning at roughly the same pitch in a circumferential direction to constitute coil end groups, the coil end groups disposed in a plurality of rows in a radial direction, a fan provided at an axial end portion of the rotor roughly facing the coil end group and generating cooling air flowing in a radial direction to ventilate the coil end group.

According to another aspect of the present invention there is provided an automotive alternator wherein: magnetic poles of the rotor are claw-shaped magnetic poles; the fan is provided at an axial end of the claw-shaped magnetic poles; shoulder portions of the claw-shaped magnetic poles are disposed facing the coil end groups; the fan faces a ventilation passage formed at a side of the coil ends away from the stator core.

According to yet another aspect of the present invention there is provided an automotive alternator wherein: cut-out portions of a rectilinear or curvilinear cross-sectional shape are provided in the shoulder portions of the claw-shaped magnetic poles, and an area of intersection between an outermost outer diameter surface of the rotor and a ridge line of the cut-out portions roughly coincides with an end surface of the stator core.

According to still another aspect of the present invention there is provided an automotive alternator wherein: cut-out portions of a rectilinear or curvilinear cross-sectional shape are provided in the shoulder portions of the claw-shaped magnetic poles, and an area of intersection between an axial end surface of the claw-shaped magnetic poles and a ridge line of the cut-out portions roughly coincides with an outer diameter of the fan.

According to yet another aspect of the present invention there is provided an automotive alternator wherein: cut-out portions of a rectilinear or curvilinear cross-sectional shape are provided in the shoulder portions of the claw-shaped magnetic poles, an area of intersection between an outermost outer diameter surface of the rotor and a ridge line of the cut-out portions roughly coincides with an end surface of the stator core, and an area of intersection between an axial end surface of the claw-shaped magnetic poles and a ridge line of the cut-out portions roughly coincides with an outer diameter of the fan.

According to still another aspect of the present invention there is provided an automotive alternator wherein: a fan is provided with blade surfaces thereof inclined toward a cut-out portion-side.

According to yet another aspect of the present invention there is provided an automotive alternator wherein: a portion inside the bracket facing the fan is a substantially empty space.

According to still another aspect of the present invention there is provided an automotive alternator wherein: planing means is provided at an inner circumferential portion of the coil end groups.

According to yet another aspect of the present invention there is provided an automotive alternator wherein: planing means is provided at an end portion of the coil end groups.

According to still another aspect of the present invention there is provided an automotive alternator wherein: planing means is provided at an inner circumferential portion and end portion of the coil end groups.

According to still yet another aspect of the present invention there is provided an automotive alternator wherein: a portion of the bracket facing the coil end group is a smooth surface and a ventilation passage for cooling air is formed between the smooth surface and a coil end group end portion.

BRIEF DESCRIPTION OF THE DRAWINGS

FIGS. 8(A) and 8(B) are an end elevation and a plan, respectively, showing an inner-layer wire-strand group constituting part of the stator winding used in the automotive alternator according to Embodiment 1 of the present invention.

FIGS. 12(A) and 12(B) are a side elevation and a rear elevation, respectively, explaining the construction of a stator core used in this automotive alternator.

DETAILED DESCRIPTION OF THE PREFERRED EMBODIMENTS

The preferred embodiment of the present invention will now be explained with reference to the drawings.

Embodiment 1

Figure 1:
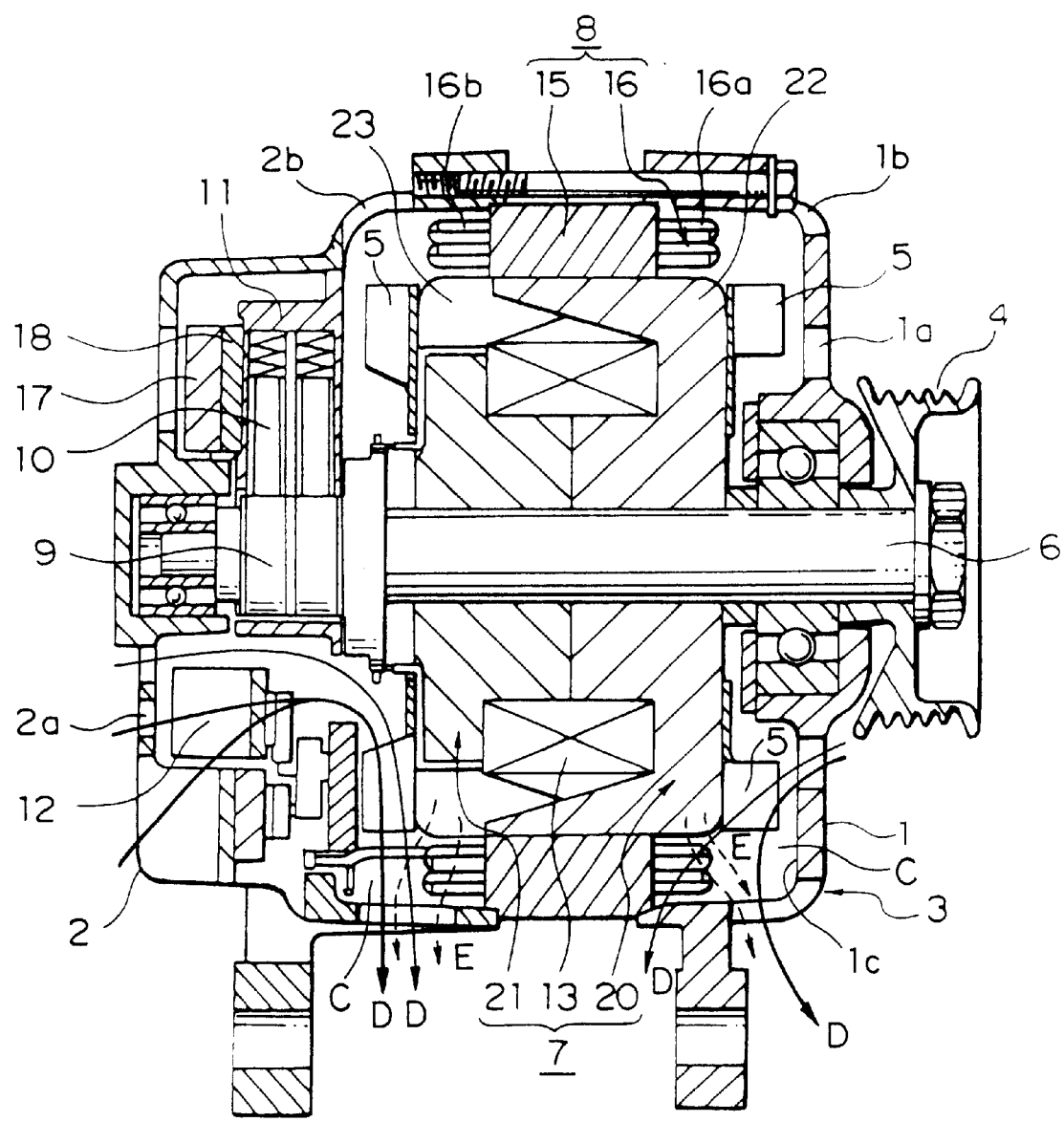
FIG. 1 is a cross section showing a construction of an automotive alternator according to Embodiment 1 of the present invention.
Figure 2:
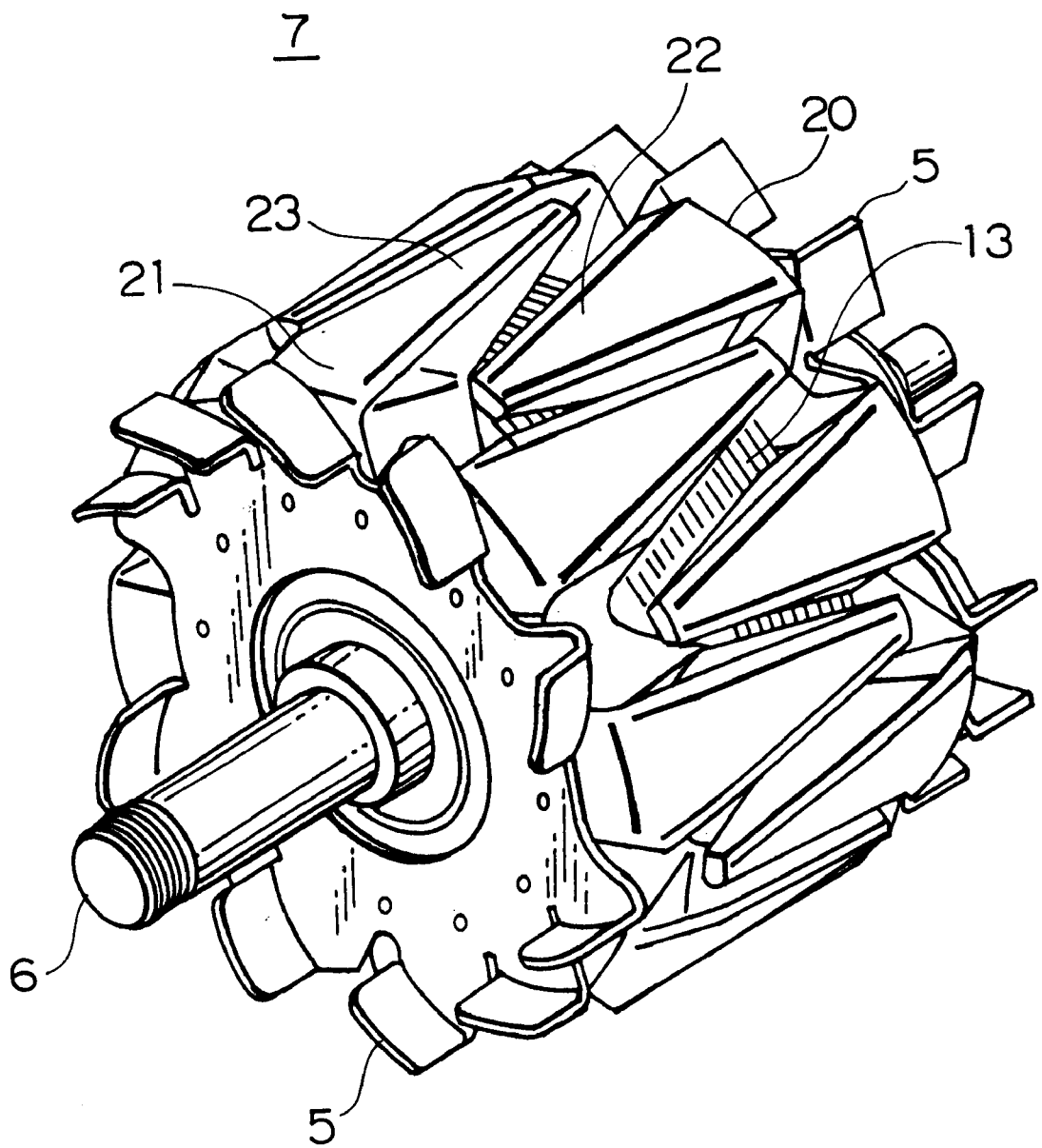
FIG. 2 is a perspective view showing a stator of the automotive alternator according to Embodiment 1 of the present invention.
Figure 3:
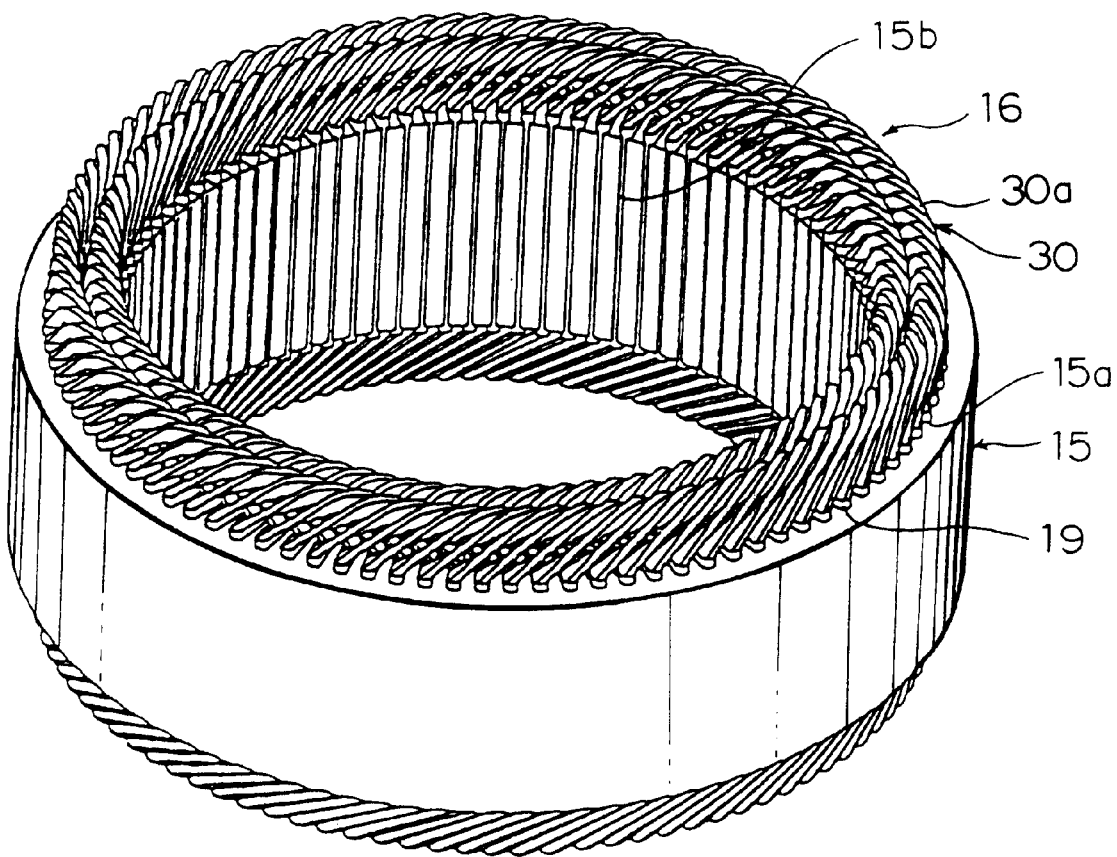
FIG. 3 is a perspective view showing a stator of the automotive alternator according to Embodiment 1 of the present invention.
Figure 4:
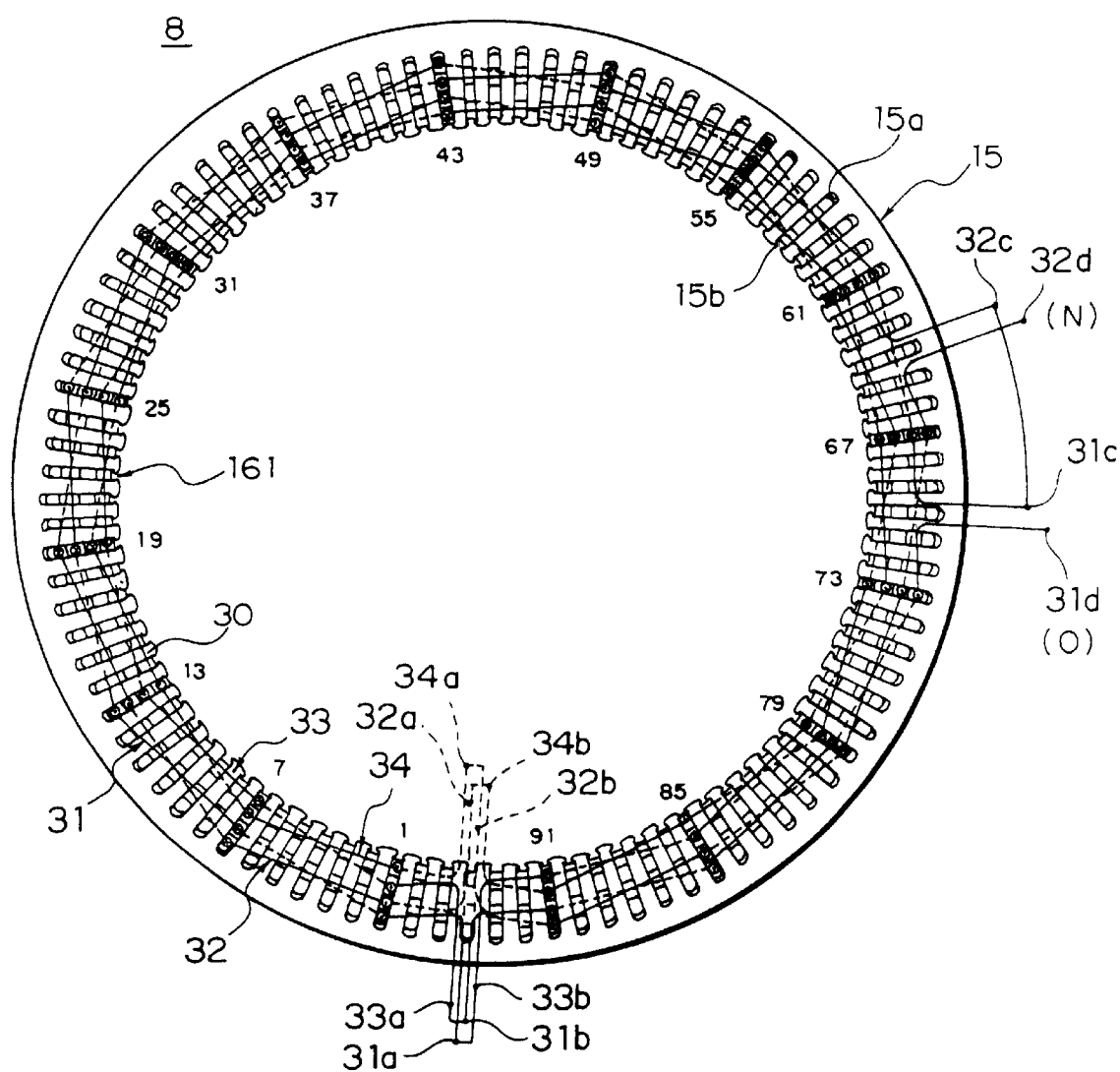
FIG. 4 is an end elevation explaining connections in one phase of a stator winding in the automotive alternator according to Embodiment 1 of the present invention.
Figure 5:
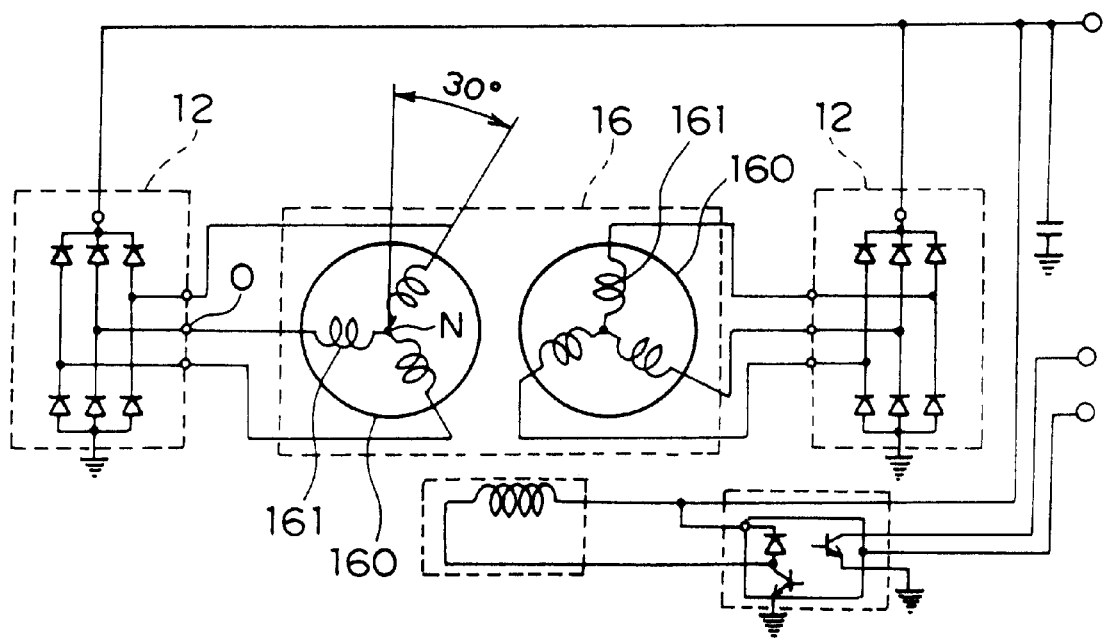
FIG. 5 is a circuit diagram for the automotive alternator according to Embodiment 1 of the present invention.
Figure 6:
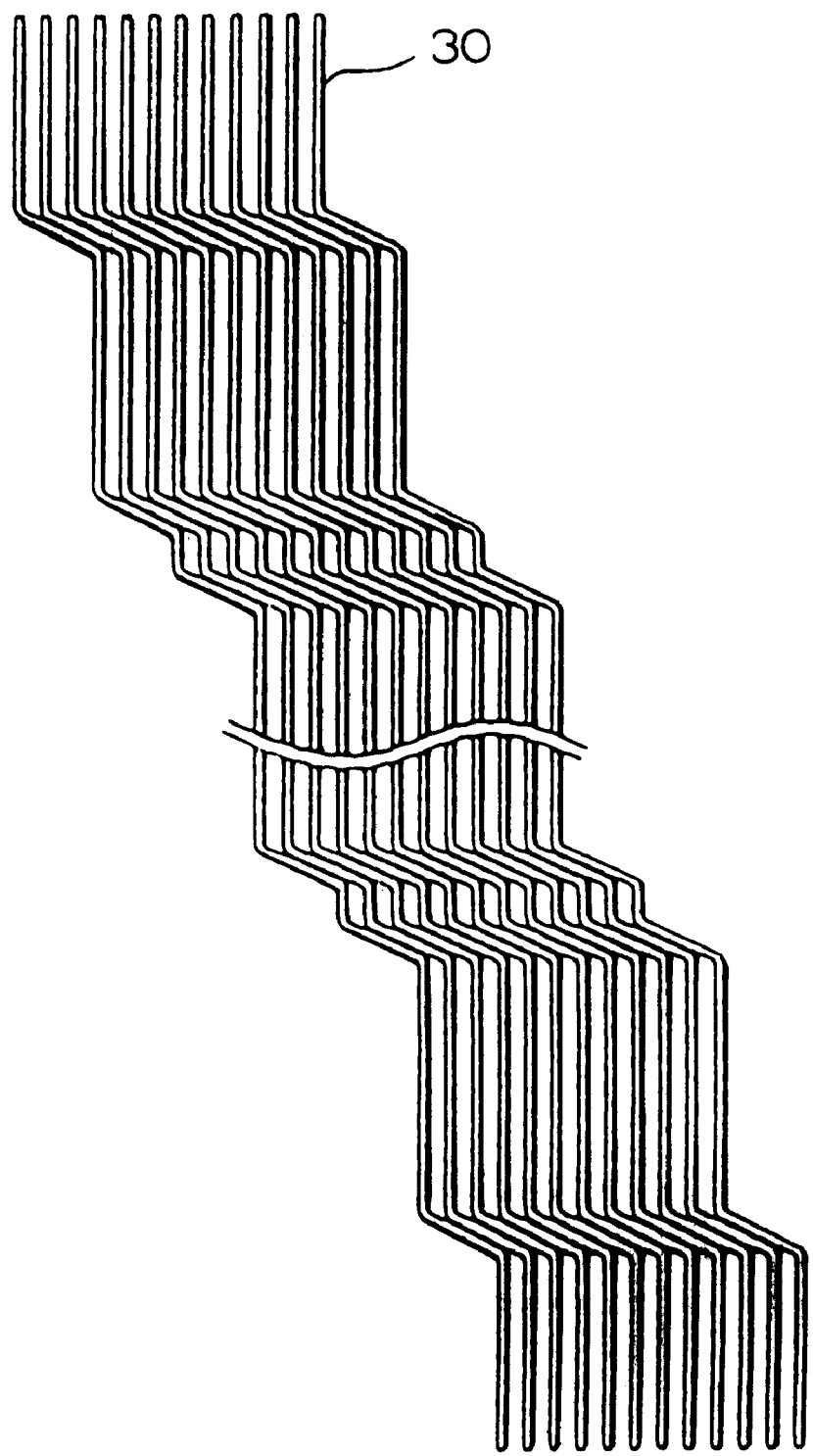
FIG. 6 is an explanatory diagram of the manufacturing process for winding groups constituting part of the stator winding used in the automotive alternator according to Embodiment 1 of the present invention.
Figure 7:
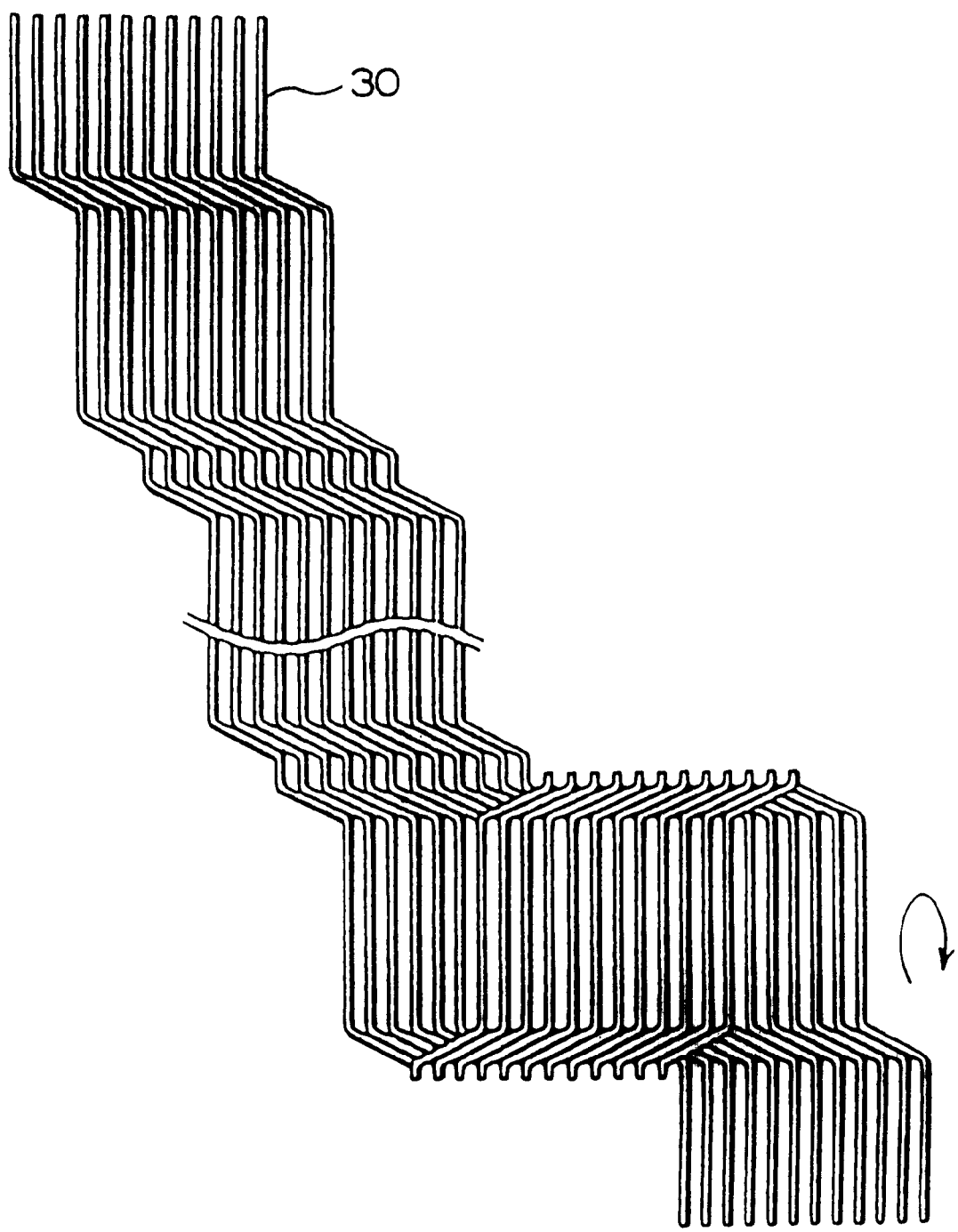
FIG. 7 is an explanatory diagram of the manufacturing process for winding groups constituting part of the stator winding used in the automotive alternator according to Embodiment 1 of the present invention.
Figures 9A, 9B:
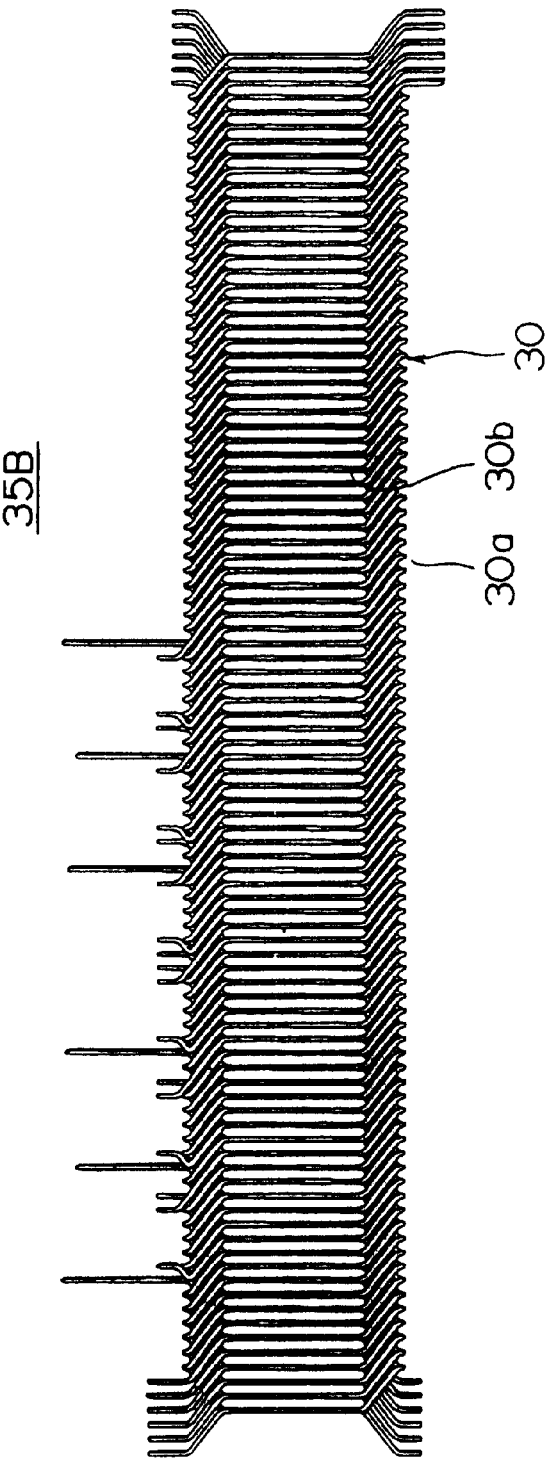
FIGS. 9(A) and 9(B) are an end elevation and a plan, respectively, showing an outer-layer wire-strand group constituting part of the stator winding used in the automotive alternator according to Embodiment 1 of the present invention.
Figure 10:
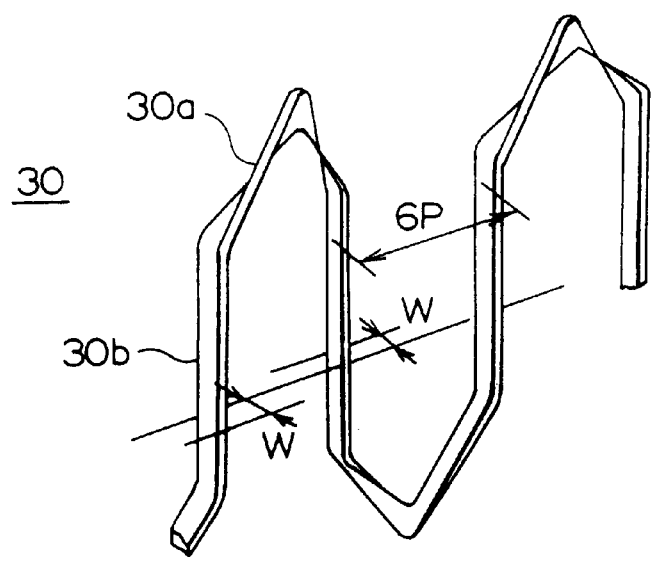
FIG. 10 is a perspective showing an essential portion of a strand of wire constituting part of the stator winding used in the automotive alternator according to Embodiment 1 of the present invention.
Figure 11:
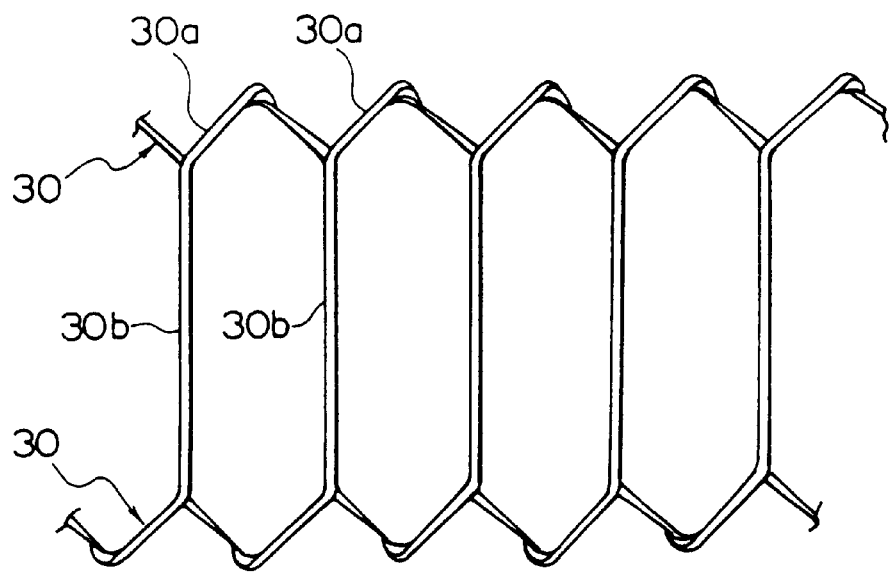
FIG. 11 is a diagram explaining arrangement of the strands of wire constituting part of the stator winding used in the automotive alternator according to Embodiment 1 of the present invention.
Figure 13A:
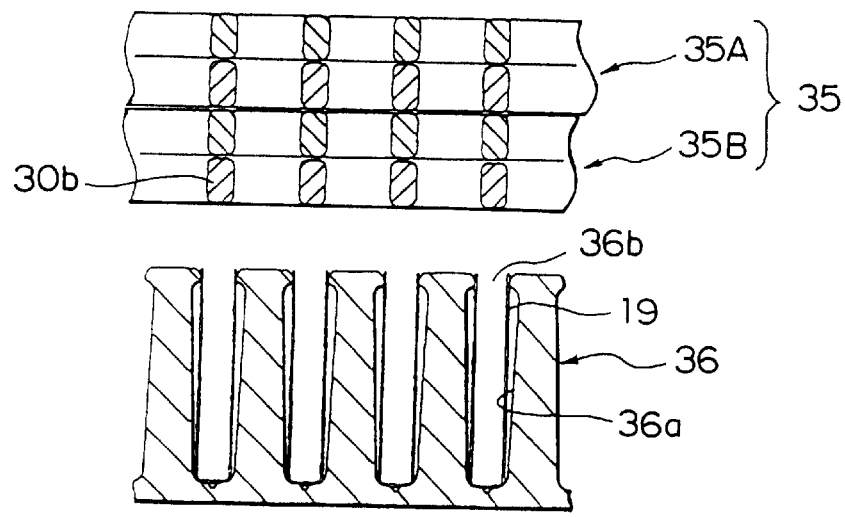
FIGS. 13(A) to 13(C) are cross sections explaining the manufacturing process for the stator used in this automotive alternator.
Figure 13B:
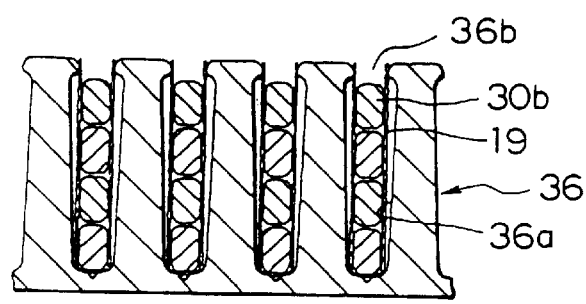
Figure 13C:
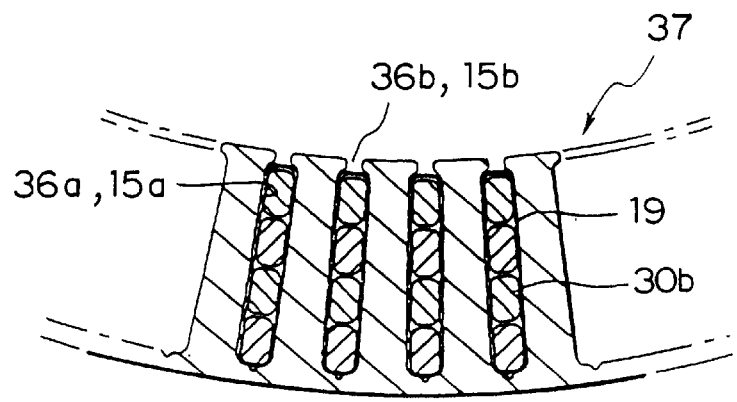
Figure 14:
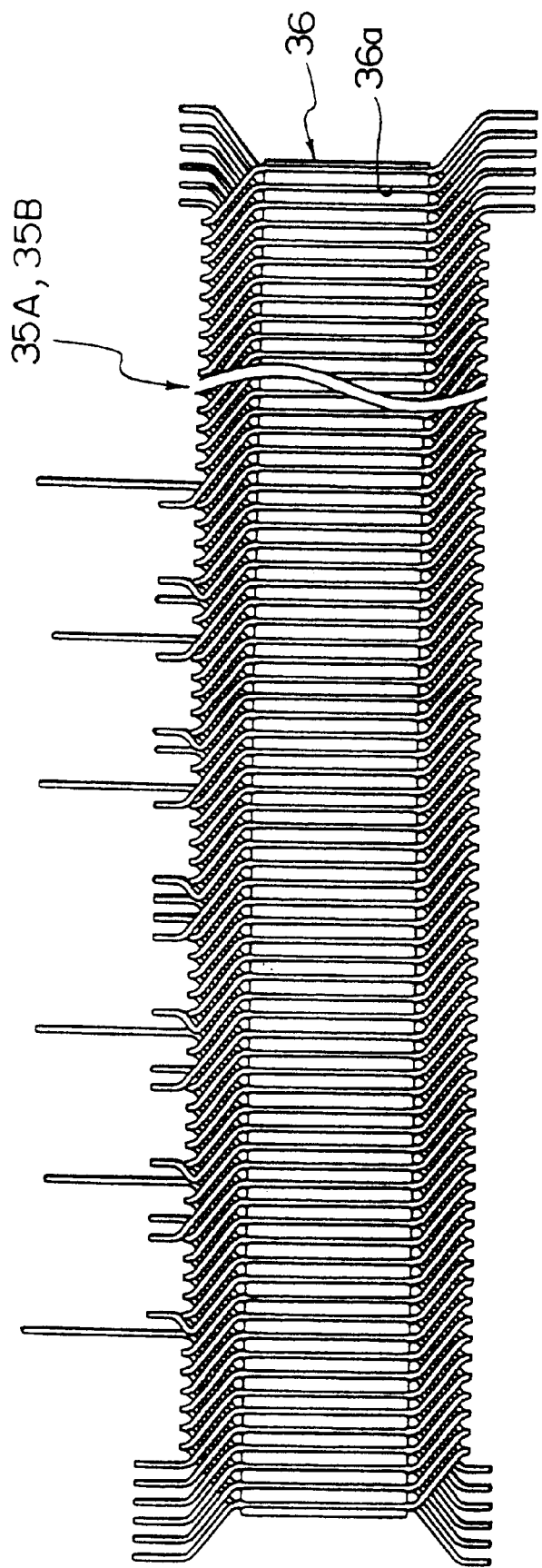
FIG. 14 is a plan view showing a wire-strand group constituting part of the stator winding used in this automotive alternator mounted into the core.
Figure 15:
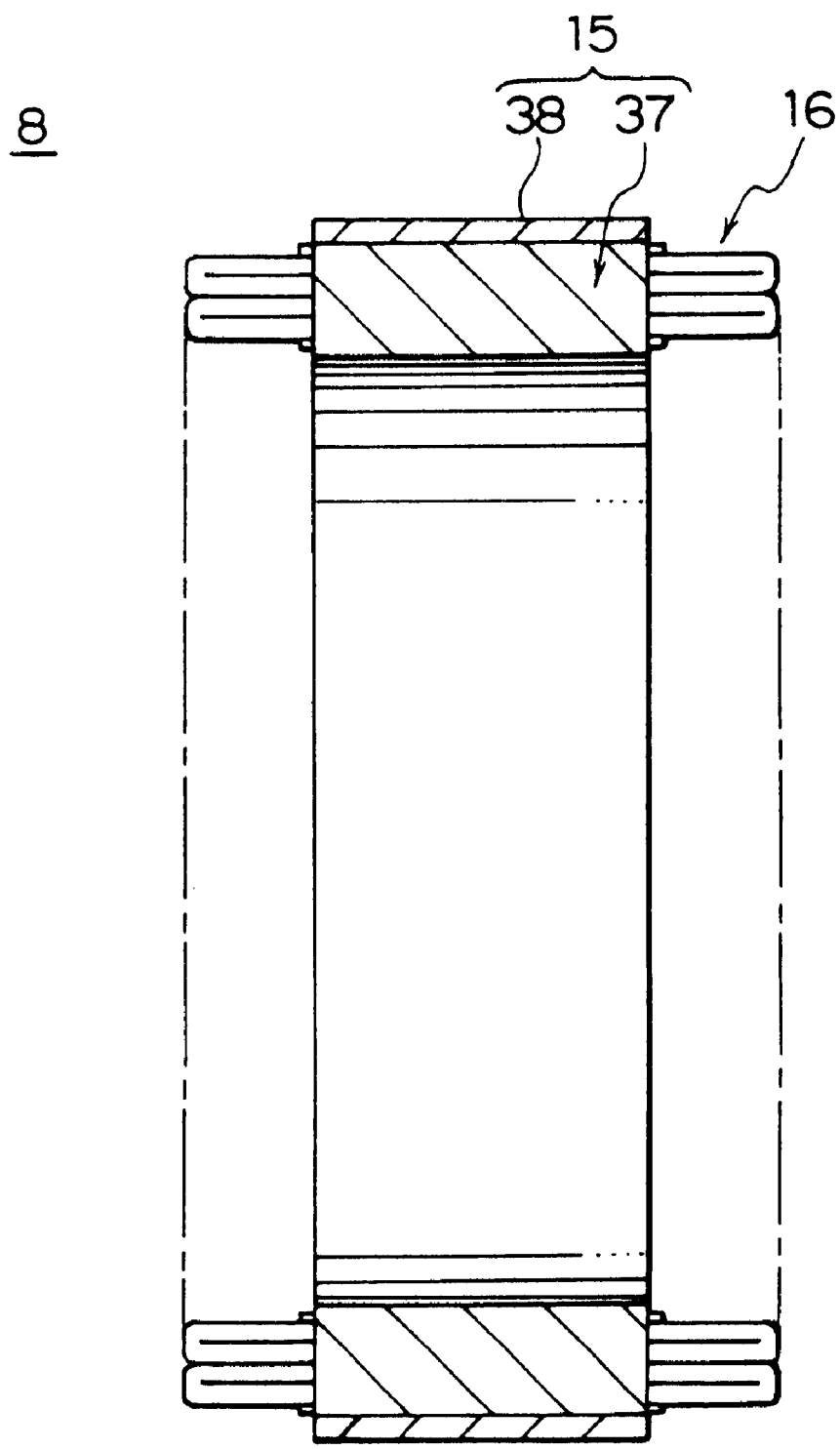
FIG. 15 is a cross section explaining the manufacturing process for the stator used in the automotive alternator according to Embodiment 1 of the present invention.

FIG. 1 is a cross section showing a construction of an automotive alternator according to Embodiment 1 of the present invention, FIG. 2 is a perspective view showing a stator of the automotive alternator, FIG. 3 is a perspective view showing a stator of the automotive alternator, FIG. 4 is an end elevation explaining connections in one phase of a stator winding in the automotive alternator, FIG. 5 is a circuit diagram for the automotive alternator, FIG. 6 is an explanatory diagram of the manufacturing process for winding groups constituting part of the stator winding used in the automotive alternator, FIG. 7 is an explanatory diagram of the manufacturing process for winding groups constituting part of the stator winding used in the automotive alternator, FIGS. 8(A) and 8(B) are an end elevation and a plan, respectively, showing an inner-layer wire-strand group constituting part of the stator winding used in the automotive alternator, FIGS. 9(A) and 9(B) are an end elevation and a plan, respectively, showing an outer-layer wire-strand group constituting part of the stator winding used in the automotive alternator, FIG. 10 is a perspective view showing an essential portion of a strand of wire constituting part of the stator winding used in the automotive alternator, FIG. 11 is a diagram explaining arrangement of the strands of wire constituting part of the stator winding used in the automotive alternator, FIGS. 12(A) and 12(B) are a side elevation and a rear elevation, respectively, explaining the construction of a stator core used in this automotive alternator, FIGS. 13(A) to 13(C) are cross sections explaining the manufacturing process for the stator used in this automotive alternator, FIG. 14 is a plan view showing a wire-strand group constituting part of the stator winding used in this automotive alternator mounted into the core, FIG. 15 is a cross section explaining the manufacturing process for the stator used in the automotive alternator. Moreover, lead wires and bridging connections have been omitted from FIG. 3.

In FIG. 1, the automotive alternator is constructed by mounting, so as to capable of rotating, a Lundell-type rotor 7 inside a case 3 constructed from an aluminum front bracket 1 and an aluminum rear bracket 2 by means of a shaft 6, and fastening a stator 8 to an inner wall of the case 3 so as to cover an outer circumferential side of the rotor 7.

The shaft 6 is supported, so as to capable of rotating, in the front bracket 1 and the rear bracket 2. A pulley 4 is fastened to a first end of this shaft 6 so that rotational torque from an engine can be transmitted to the shaft 6 by means of a belt (not shown). Slip rings 9 for supplying electric current to the rotor 7 are fastened to a second end of the shaft 6, and a pair of brushes 10 are housed in a brush holder 11 disposed inside the case 3 such that the pair of brushes 10 slide in contact with the slip rings 9. A regulator 18 for adjusting the magnitude of alternating voltage generated in the stator 8 is fastened by adhesive to a heat sink 17 fitted onto the brush holder 11. Rectifiers 12 which are electrically connected to the stator 8 and convert alternating current generated in the stator 8 into direct current are mounted inside the case 3.

In FIG. 2, the rotor 7 is composed of a rotor coil 13 for generating magnetic flux on passage of electric current, and a pair of pole cores 20 and 21 disposed so as to cover the rotor coil 13, magnetic poles being formed in the pole cores 20 and 21 by magnetic flux generated in the rotor coil 13. The pair of pole cores 20 and 21 are made of iron, each has eight claw-shaped magnetic poles 22 and 23 disposed on an outer circumferential perimeter at even pitch in a circumferential direction so as to project axially, and the pole cores 20 and 21 are fastened to the shaft 6 facing each other such that the claw-shaped magnetic poles 22 and 23 intermesh. In addition, fans 5 are fastened to first and second axial ends of the rotor 7.

Returning to FIG. 1, air intake vents 1a and 2a are disposed in axial end surfaces of the front bracket 1 and the rear bracket 2, and air discharge vents 1b and 2b are disposed in two outer circumferential shoulder portions of the front bracket 1 and the rear bracket 2, opposite the radial outside of the front-end and rear-end coil ends 16a and 16b of the stator winding 16.

As shown in FIG. 3, the stator 8 includes: a cylindrical stator core 15 composed of a laminated core formed with a number of slots 15a extending longitudinally at a predetermined pitch in a circumferential direction; a polyphase stator winding 16 wound onto the stator core 15; and insulators 19 installed in each of the slots 15a for electrically insulating the polyphase stator winding 16 from the stator core 15. The polyphase stator winding 16 includes a number of windings in each of which one strand of wire 30 is bent back outside the slots 15a at end surfaces of the stator core 15 and wound into a wave winding so as to alternately occupy an inner layer and an outer layer in a slot depth direction within slots 15a a predetermined number of slots apart. In this case, the stator core 15 is formed with ninety-six slots 15a at even pitch so as to house two sets of three-phase stator winding portions 160 such that the number of slots housing each phase of the winding portions corresponds to the number of magnetic poles (sixteen) in the rotor 7. Long, insulated copper wire material having a rectangular cross section, for example, is used in the strands of wire 30.

Next, the winding construction of one phase of a stator winding group 161 will be explained in detail with reference to FIG. 4.

One phase of the stator winding group 161 is composed of first to fourth winding sub-portions 31 to 34 each formed from one strand of wire 30. The first winding sub-portion 31 is formed by wave winding one strand of wire 30 into every sixth slot from slot numbers 1 to 91 so as to alternately occupy a first position from an outer circumferential side and a second position from the outer circumferential side inside the slots 15a. The second winding sub-portion 32 is formed by wave winding a strand of wire 30 into every sixth slot from slot numbers 1 to 91 so as to alternately occupy the second position from the outer circumferential side and the first position from the outer circumferential side inside the slots 15a. The third winding sub-portion 33 is formed by wave winding a strand of wire 30 into every sixth slot from slot numbers 1 to 91 so as to alternately occupy a third position from the outer circumferential side and a fourth position from the outer circumferential side inside the slots 15a. The fourth winding sub-portion 32 is formed by wave winding a strand of wire 30 into every sixth slot from slot numbers 1 to 91 so as to alternately occupy the fourth position from the outer circumferential side and the third position from the outer circumferential side inside the slots 15a. The strands of wire 30 are arranged to line up in a row of four strands within each slot 15a with the longitudinal direction of their rectangular cross sections aligned in a radial direction.

At a first end of the stator core 15, a first end portion 31a of the first winding sub-portion 31 extending outwards from slot number 1 and a second end portion 33b of the third winding sub-portion-33 extending outwards from slot number 91 are joined, and in addition, a first end portion 33a of the third winding sub-portion 33 extending outwards from slot number 1 and a second end portion 31b of the first winding sub-portion 31 extending outwards from slot number 91 are joined to form two turns of winding.

At a second end of the stator core 15, a first end portion 32a of the second winding sub-portion 32 extending outwards from slot number 1 and a second end portion 34b of the fourth winding sub-portion 34 extending outwards from slot number 91 are joined, and in addition, a first end portion 34a of the fourth winding sub-portion 34 extending outwards from slot number 1 and a second end portion 32b of the second winding sub-portion 32 extending outwards from slot number 91 are joined to form two turns of winding.

In addition, a portion of the strand of wire 30 of the second winding sub-portion 32 extending outwards at the first end of the stator core 15 from slot numbers 61 and 67 is cut, and a portion of the strand of wire 30 of the first winding sub-portion 31 extending outwards at the first end of the stator core 15 from slot numbers 67 and 73 is also cut. A first cut end 31c of the first winding sub-portion 31 and a first cut end 32c of the second winding sub-portion 32 are joined to form one phase of the stator winding group 161 having four turns connecting the first to fourth winding sub-portions 31 to 34 in series.

Moreover, the joint portion between the first cut end 31c of the first winding sub-portion 31 and the first cut end 32c of the second winding sub-portion 32 becomes a bridging connection connecting portion, a second cut end 31d of the first winding sub-portion 31 and a second cut end 32d of the second winding sub-portion 32 become an lead wire (O) and a neutral-point lead wire (N), respectively.

Six phases of stator winding groups 161 are similarly formed by offsetting the slots 15a into which the strands of wire 30 are wound one slot at a time. Then, as shown in FIG. 5, three phases each of the stator winding groups 161 are connected into star connections to form the two sets of three-phase stator winding portions 160, and each of the three-phase stator winding portions 160 is connected to its own rectifier 12. The rectifiers 12 are connected in parallel so that the direct-current output from each is combined.

Here, the strands of wire 30 constituting the first to fourth winding sub-portions 31 to 34 are each wound into a wave winding so as to extend out of first slots 15a at end surfaces of the stator core 15, fold back, and enter second slots 15a six slots away. Each of the strands of wire 30 is also wound so as to alternately occupy the inner layer and the outer layer relative to the slot depth direction (the radial direction) in every sixth slot.

Turn portions 30a of the strands of wire 30 extend outwards from the stator core 15 and fold back to form coil ends. The turn portions 30a which are formed into substantially the same shape at both axial ends of the stator core 15 are mutually spaced circumferentially and radially, and arranged neatly in two rows circumferentially, to form coil-end portions 16a and 16b.

Next, the assembly of the stator 8 will be explained with reference to FIGS. 6 to 15.

First, as shown in FIG. 6, twelve long strands of wire 30 are simultaneously bent in the same plane to form a lightning-bolt shape. Then, a wire-strand group 35A, shown in FIGS. 8(A) and 8(B), is prepared by progressively folding the strand at right angles, as indicated by the arrow in FIG. 7, using a jig. In addition, a wire-strand group 35B including bridging connections and lead wires, as shown in FIGS. 9(A) and 9(B), is prepared in a similar manner. The wire-strand groups 35A and 35B are then annealed for ten minutes at 300° C. so that a parallelepiped core 36 mounted with the wire-strand groups 35A and 35B can be easily formed into an annular shape.

Moreover, as shown in FIG. 10, each strand of wire 30 is formed by bending it into a planar pattern in which straight portions 30b connected by turn portions 30a are lined up at a pitch of six slots (6P). Adjacent straight portions 30b are offset by a distance equal to one width (W) of the strands of wire 30 by means of the turn portions 30a. The wire-strand groups 35A and 35B are constructed by arranging six wire-strand pairs so as to be offset by a pitch of one slot from each other, each wire-strand pair consisting of two strands of wire 30 formed in the above pattern which are offset by a pitch of six slots and arranged such that straight portions 30b overlap as shown in FIG. 11. Six end portions of the strands of wire 30 each extend outwards from first and second sides at first and second ends of the wire-strand groups 35A and 35B. Furthermore, the turn portions 30a are arranged so as to line up in rows on first and second side portions of the wire-strand groups 35A and 35B.

The parallelepiped core 36 is prepared as shown in FIGS. 12(A) and 12(B) by laminating a predetermined number of sheets of SPCC material formed with trapezoidal slots 36a at a predetermined pitch (an electrical angle of 30°) and laser welding an outer portion thereof.

As shown in FIG. 13(A), the insulators 19 are mounted in the slots 36a of the parallelepiped core 36, and the straight portions of the two wire-strand groups 35A and 35B are inserted so as to stack up within each of the slots. In this manner, the two wire-strand groups 35A and 35B are installed in the parallelepiped core 36 as shown in FIG. 13(B). At this time, straight portions 30b of the strands of wire 30 are housed in lines of four in a radial direction within the slots 36a and are electrically insulated from the parallelepiped core 36 by the insulators 19. The two wire-strand groups 35A and 35B are stacked one on top of the other when installed in the parallelepiped core 36 as shown in FIG. 14.

Next, the parallelepiped core 36 is rolled up and its ends abutted and welded to each other to obtain a cylindrical core 37, as shown in FIG. 13(C). By rolling up the parallelepiped core 36, the slots 36a (corresponding to the slots 15a in the stator core) take on a generally rectangular cross-sectional shape, and opening portions 36b of the slots 36a (corresponding to opening portions 15b of the slots 15a) become smaller than the slot-width dimensions of the straight portions 30b. Then, the end portions of each of the strands of wire 30 are connected to each other based on the connections shown in FIG. 4 to form a stator winding groups 161. Thereafter, the cylindrical core 37 is inserted into a cylindrical outer core 38 composed of laminated SPCC material and integrated by shrink fitting to obtain the stator 8 shown in FIG. 15. The integrated body consisting of the cylindrical core 37 and the outer core 38 corresponds to the stator core 15.

In the automotive alternator constructed in this manner, electric current is supplied from a battery (not shown) through the brushes 10 and the slip rings 9 to the rotor coil 13, generating magnetic flux. The claw-shaped magnetic poles 22 of the first pole core 20 are magnetized with north-seeking (N) poles by this magnetic flux, and the claw-shaped magnetic poles 23 of the first pole core 21 are magnetized with south-seeking (S) poles thereby. At the same time, rotational torque from the engine is transmitted through the belt and the pulley 4 to the shaft 6, rotating the rotor 7. Thus, a rotating magnetic field is applied to the polyphase stator winding 16, generating electromotive force in the polyphase stator winding 16. This alternating electromotive force passes through the rectifiers 12 and is converted into direct current, the magnitude of the current is adjusted by the regulator 18, and the battery is recharged.

At the rear end, external air is drawn in through the air intake vents 2a disposed opposite the heat sinks of the rectifiers 12 and the heat sink 17 of the regulator 18, respectively, by rotation of the fans 5, flowing along the axis of the shaft 6, cooling the rectifiers 12 and the regulator 18, and is then deflected centrifugally by the fans 5, cooling the rear-end coil end group 16b of the polyphase stator winding 16 before being expelled to the outside through the air discharge vents 2b. At the same time, at the front end, external air is drawn in axially through the air intake vents 1a by rotation of the fans 5, and is then deflected centrifugally by the fans 5, cooling the front-end coil end group 16a of the polyphase stator winding 16 before being expelled to the outside through the air discharge vents 1b.

According to Embodiment 1, an automotive alternator of the present invention includes:

the rotor 7;

the stator 8 including:
  the stator core 15 disposed facing the rotor 7; and
  the polyphase stator winding 16 installed in the stator core 15; and the bracket 1, 2 housing and supporting the rotor 7 and the stator 8;

the stator core 15 formed with a number of slots 15a extending axially at a predetermined pitch in a circumferential direction, the polyphase stator winding 16 including a number of winding portions in which long wire strands 30 are wound so as to alternately occupy an inner layer and an outer layer in a slot depth direction within the slots 15a at intervals of a predetermined number of slots 15a, the wire strands 30 folding back outside the slots 15a at axial end surfaces of the stator core 15 to form turn portions 30a, and a plurality of the wire strands 30 lining up in a row in a radial direction inside the slots 15a of the stator core 15, the turn portions 30a of the wire strands 30 being roughly the same shape and aligning at roughly the same pitch in a circumferential direction to constitute coil end groups 16a, 16b, the coil end groups 16a, 16b disposed in two (2) rows in the radial direction, the fan 5 provided at an axial end portion of the rotor 7 roughly facing the coil end group and generating cooling air which flows in a radial direction to ventilate the coil end groups 16a, 16b.

In the polyphase stator winding 16 including a number of winding portions, long wire strands 30 are wound so as to alternately occupy an inner layer and an outer layer in a slot depth direction within the slots 15a at intervals of a predetermined number of slots 15a. Thus, there are no welds, the height of the coil ends may be reduced, copper loss in the coil is reduced and the temperature may be lowered and the output and efficiency increased. Also, interference of the coil ends provided in the cooling air ventilation passages may be lowered and noise may be decreased.

Moreover, pairs of inner and outer turn portions 30a are disposed so as not overlap in the axial direction and line up in two (2) rows in radial directions. Thus, axial and circumferential surfaces of the coil having the two-row coil end groups 16a, 16b are exposed to cooling air flowing in a radial direction and cooling performance is improved.

Furthermore, the magnetic poles of the rotor are claw-shaped magnetic poles 22, 23, the fans 5 are provided at axial ends of the claw-shaped magnetic poles 22, 23, shoulder portions of the claw-shaped magnetic poles 22, 23 are disposed facing the coil end groups 16a, 16b and the fans 5 face a ventilation passage C formed at the sides of the coil ends away from the stator core. The claw-shaped magnetic poles 22, 23 have an air blowing cooling function similar to that of the fan 5—blowing air to the coil end groups 16a, 16b to cool the coil end groups 16a, 16b. The fans 5 face the cooling air ventilation passages C formed at the side of the coil ends 16a, 16b away from the stator core 15, and since cooling air D (shown in FIG. 1 by solid arrows) is ventilated at a high speed in a radial direction inside these ventilation passages C, low pressure develops in the ventilation passages C and cooling air E (shown in FIG. 1 by dotted-line arrows) generated by the shoulder portions of the claw-shaped magnetic poles 22, 23 for cooling the above coil end groups 16a, 16b is induced and cooling performance is improved.

Moreover, a space (that is, the ventilation passage C) facing the fan 5 in the bracket 1, 2 constitutes only a substantially empty space. Since there are no obstructions provided in the space facing the fan 5, pressure loss of the fan 5 decreases and interference is reduced, and cooling air E is inducted in the coil end groups 16a, 16b and cooling performance is improved.

Also, smooth surfaces 1c of the bracket 1 face the coil end groups 16a, 16b, and the ventilation passage C in which cooling air D circulates is formed between end portions of the smooth surfaces 1c and the coil end groups 16a, 16b. Hence, the smooth surfaces 1c do not obstruct the flow of the cooling air D. Consequently, cooling air D interference (noise) due to the bracket 1, 2 is reduced. Further, the flow of the cooling air D is rectified by the smooth surfaces 1c and cooling performance is improved.

Moreover, although in the above embodiment the stator core is equipped with a cylindrical outer core, the cylindrical outer core may be eliminated. With such a construction the cylindrical outer core insertion step is eliminated and a capacity for production is improved, also, it is possible to suppress degradation of thermal conductivity in the core occurring as the result of a gap between the inner and outer cylindrical core, a reduction in output may be prevented and magnetic noise degradation may be suppressed.

Furthermore, although the above embodiment was explained using wire strands of copper wire with a rectilinear cross-section, the wire strands are not limited thereto. For example, copper wire with a cylindrical cross-section or a mix of cylindrical cross-section and rectilinear cross-section wire may also be used. With such a construction, when wire having a cylindrical cross-section is employed at locations intersected by the ventilation, ventilating resistance caused by passage of the ventilation is reduced and the cooling performance is further improved. Also, since the compactibility of the wire strands is improved, configuration and connection of the wire strands is improved and workability is particularly improved. Further, the wire strands are not limited to copper wire, for example, aluminum wire may also be used.

Embodiment 2

Figure 16:
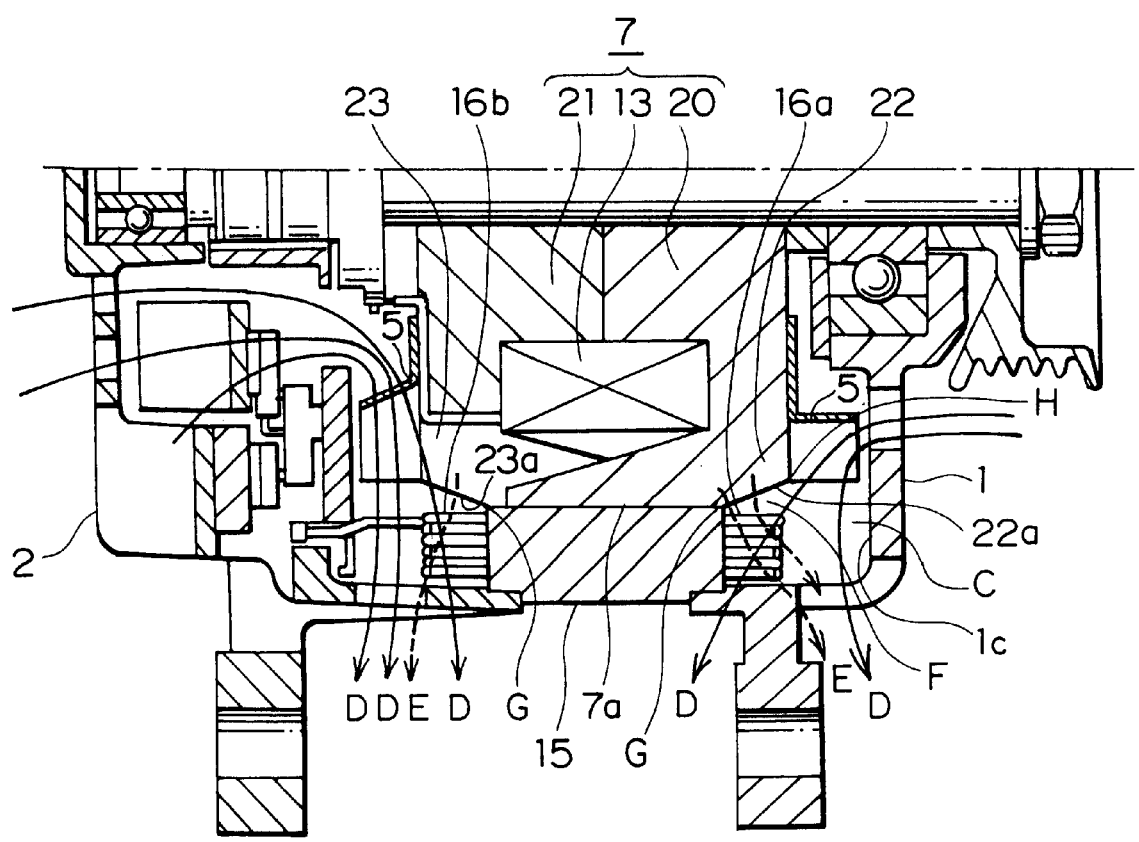
FIG. 16 is a partial cross section showing a construction of an automotive alternator according to Embodiment 2 of the present invention.
Figure 17:
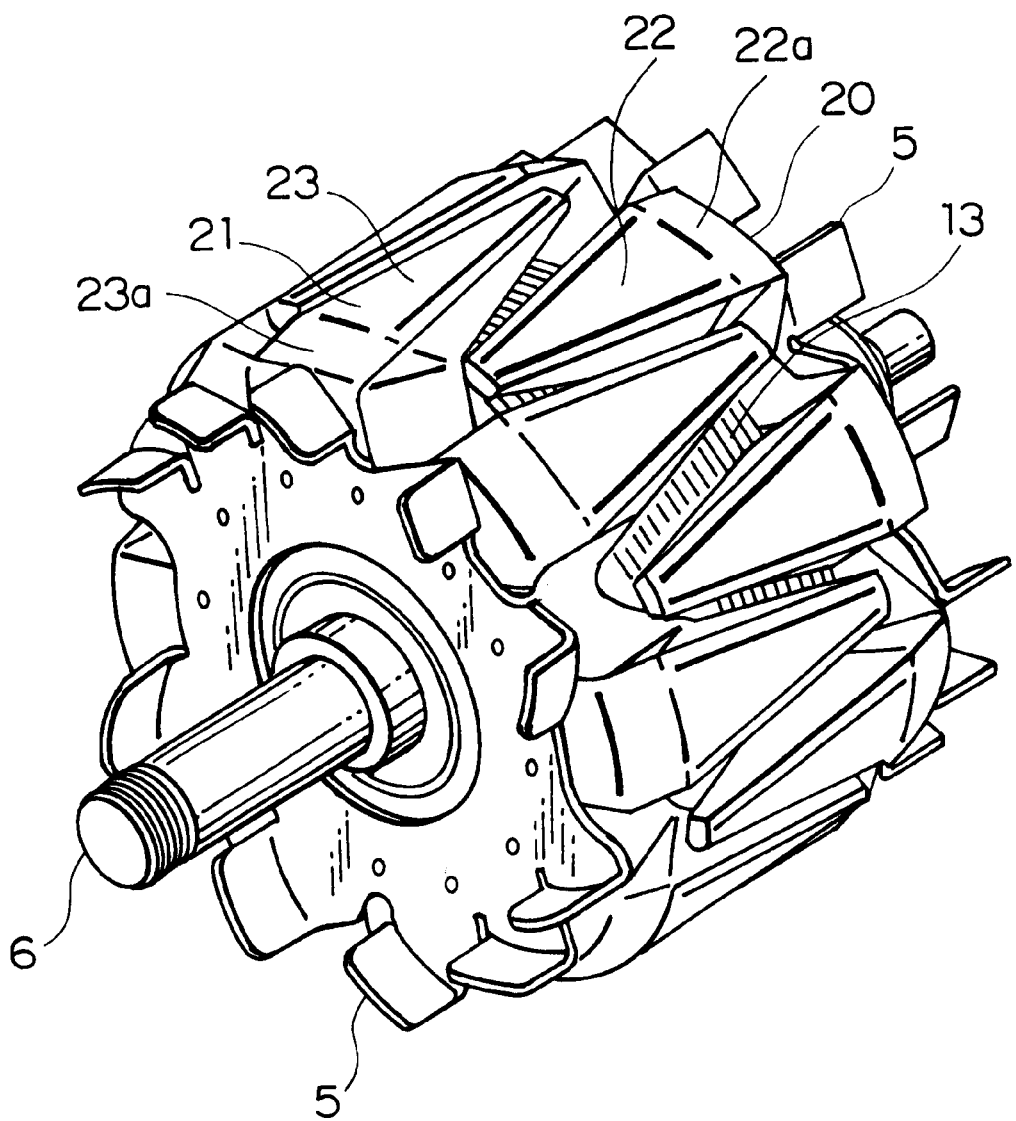
FIG. 17 is a perspective showing a rotor of the automotive alternator.

FIG. 16 is a partial cross section showing a construction of an automotive alternator according to Embodiment 2 of the present invention and FIG. 17 is a perspective view showing a rotor of the automotive alternator. In the mode of the present embodiment three (3) wire-strand groups are inserted stacked in stator core 15. Thus, turn portions 30a are formed lining up in three rows at coil end groups 16a, 16b. Also, shoulder portions of claw-shaped magnetic poles 22, 23 are cut out to form rectilinear (tapered) cut out portions 22a, 23a. Fan(s) 5 is of a smaller diameter than that in Embodiment 1 and is mounted shifted back an amount corresponding to the size of cut out portions 22a, 23a. Thus, in the mode of the present embodiment three (3) rows of turn portions 30a are efficiently cooled in response to the cooling air flowing in a radial direction. Moreover, the ventilation passage(s) are expanded by the cut out portions 22a, 23a of the claw-shaped magnetic poles 22, 23 and cooling performance is improved. Hence, even the small diameter fan has sufficient cooling performance. Also, since the ventilation passages are expanded, ventilation resistance is further decreased and noise is reduced.

According to Embodiment 2 cut out portions 22a, 23a of a rectilinear cross-section are provided in shoulder portions of claw-shaped magnetic poles 22, 23 and an area of intersection G between an outermost outer diameter surface (s) 7a of the rotor 7 and ridge lines of the cut out portions 22a, 23a is approximately coincident with an end surface of the stator core 15. An annular space(s) extending in a circumferential direction is formed as a result of forming the cut out portions 22a, 23a. This space(s) constitutes ventilation passage(s) C and adjacent ventilation passage(s) F. Thus, the component of cooling air D in the circumferential direction increases and cooling performance may thereby be increased. Accordingly, the air cooling function of the shoulder portions of claw-shaped magnetic poles 22, 23 is not inhibited and the cooling performance may be improved. Also, since an outer circumferential corner portion of the end surface of the stator 15 and the ridge line of the cut out portion coincide in the circumferential direction, interference is reduced.

Furthermore, according to Embodiment 2, the outer circumference of the fan(s) 5 roughly coincides with an area of intersection H between axial end surfaces of the claw-shaped magnetic poles 22, 23 and ridge lines of the cut out portions 22a, 23a. Normally, since momentum is greatest at an outermost diameter-side of a fan and respective cooling air thus has a high speed, resistance at the discharge-side greatly worsens pressure loss. However, the annular space(s) extending in the circumferential direction is formed outside a radial direction of the fan(s) 5 as a result of forming the cut out portions 22a, 23a. The outer circumference of the fan 5 coincides with the area of intersection H between axial end surfaces of the claw-shaped magnetic poles 22, 23 and ridge lines of the cut out portions 22a, 23a, and since the fan 5 faces this space, the ventilation passage is enlarged when the cooling air leaves from the fan 5, pressure loss is reduced at the discharge-side of the fan 5 and cooling performance is improved. Thus, cooling performance is maintained, and it is possible to reduce noise because the fan 5 may be of a small diameter.

Moreover, although in the present embodiment the cut out portions 22*a*, 23*a* are rectilinear in cross-section, the present invention is not limited thereto, and, so long as a radius of curvature is large, they may be curvilinear in cross-section. In this case, convex surfaces and concave surfaces exhibit approximately the same effects.

Embodiment 3

Figure 18:
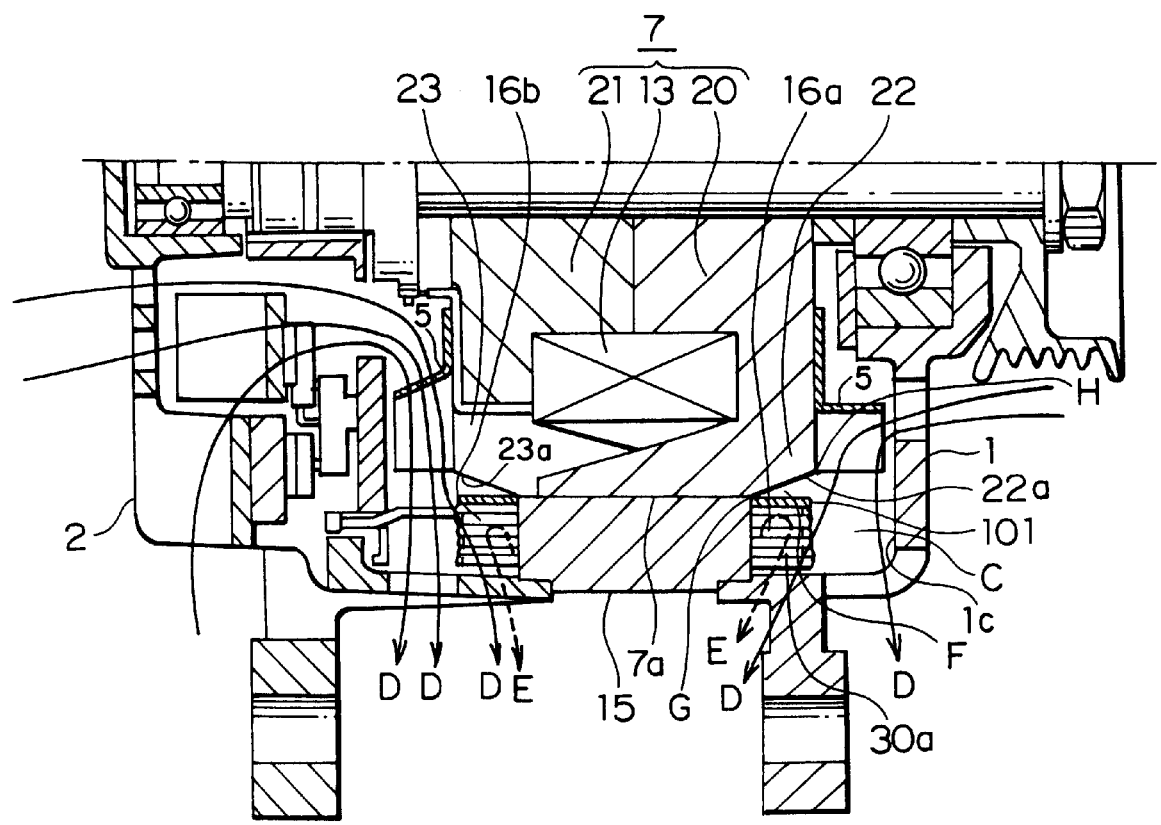
FIG. 18 is a partial cross section showing a construction of an automotive alternator according to Embodiment 3 of the present invention.

FIG. 18 is a partial cross section showing a construction of an automotive alternator according to Embodiment 3 of the present invention. In the present embodiment, a shielding plate(s) 101 is provided as planing means at an inner circumferential portion of the coil end groups. All other constructions are the same as in Embodiment 2.

In the automotive alternator according to Embodiment 3 structured as above, since the shielding plate 101 is provided as planing means at an inner circumferential portion of the coil end groups, interference may be reduced. Also, the three rows of turn portions 30*a* are disposed lined up in radial directions and so as to not overlap in an axial direction. The inside of the coil ends is at a low pressure due to the action of the shielding plate 101 which is mounted so as to face the cooling air D flowing in a radial direction and a portion of the cooling air D flows in from an end portion of the coil end, and air flow is inducted inside the coil ends from the outside and the cooling performance may be improved.

Moreover, although in the present embodiment the shielding plate 101 is the planing means, the planing means is not limited thereto. For example, a smoothed surface of a molding resin covering the end groups 16*a*, 16*b* may also be provided.

Embodiment 4

Figure 19:
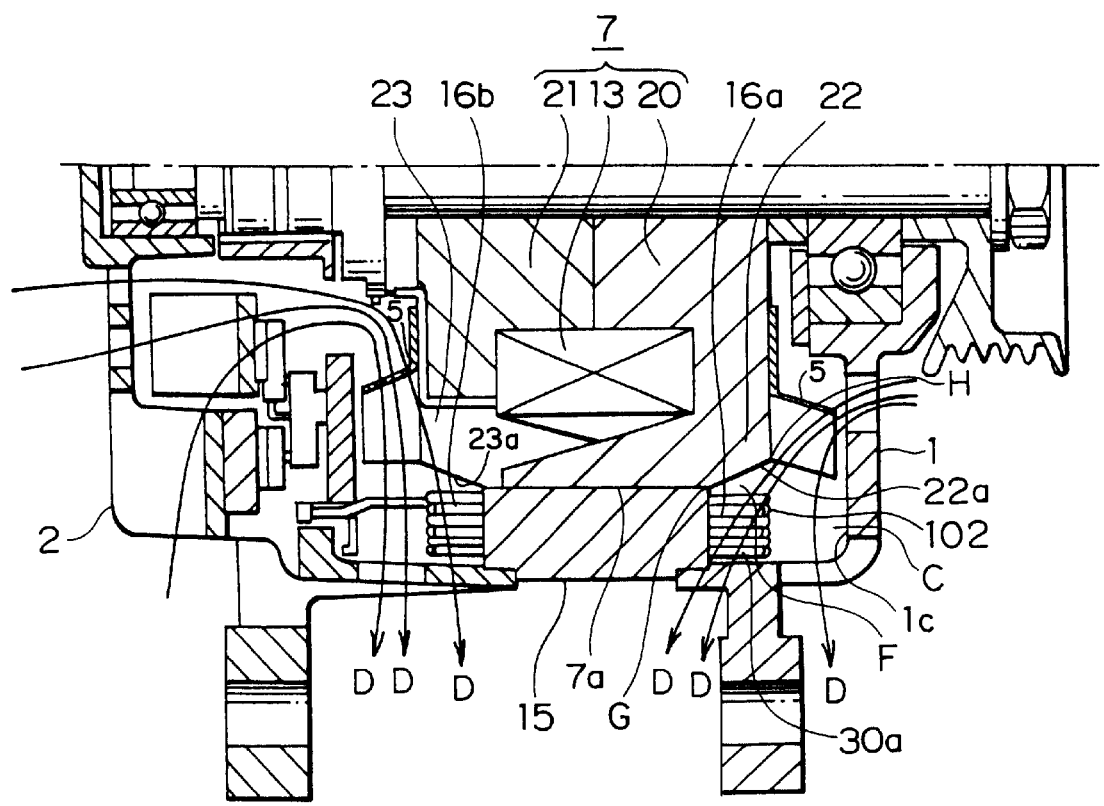
FIG. 19 is a partial cross section showing a construction of an automotive alternator according to Embodiment 4 of the present invention.

FIG. 19 is a partial cross section showing a construction of an automotive alternator according to Embodiment 4 of the present invention. In the present embodiment, a shielding plate(s) 102 is provided as planing means at end portions of the coil end groups. Also, the fan 5 at the front side is provided with blade surfaces thereof inclined toward the cut-out portions 22*a*. All other constructions are the same as in Embodiment 2.

In the automotive alternator according to Embodiment 4 structured as above, the shielding plate 102 is provided as planing means at end portions of the coil end groups 16*a*, 16*b*. Thus, interference may be reduced. Also, the three rows of turn portions 30*a* are disposed lined up in radial directions and so as to not overlap in an axial direction, and the above shielding plate 102 is provided. The shielding plate 102 guides the cooling air D, and since the cooling air D is positively ventilated without any obstruction along the way, cooling performance may be improved.

Furthermore, the fan 5 is provided with blade surfaces thereof inclined toward the cut-out portions 22*a*, and there is a larger component of cooling air which directly contacts the coil end groups 16*a* 16*b* via the annular ventilation passage F extending in a circumferential direction and formed as a result of the cut out portions 22*a*. The component of cooling air flowing in an axial direction due to the inclined blade surfaces increases relative to that flowing in a radial direction, and sufficient cooling performance is provided because there is an influx of cooling air in an outside diameter direction from an inner circumference of the coil end.

Figure 20:
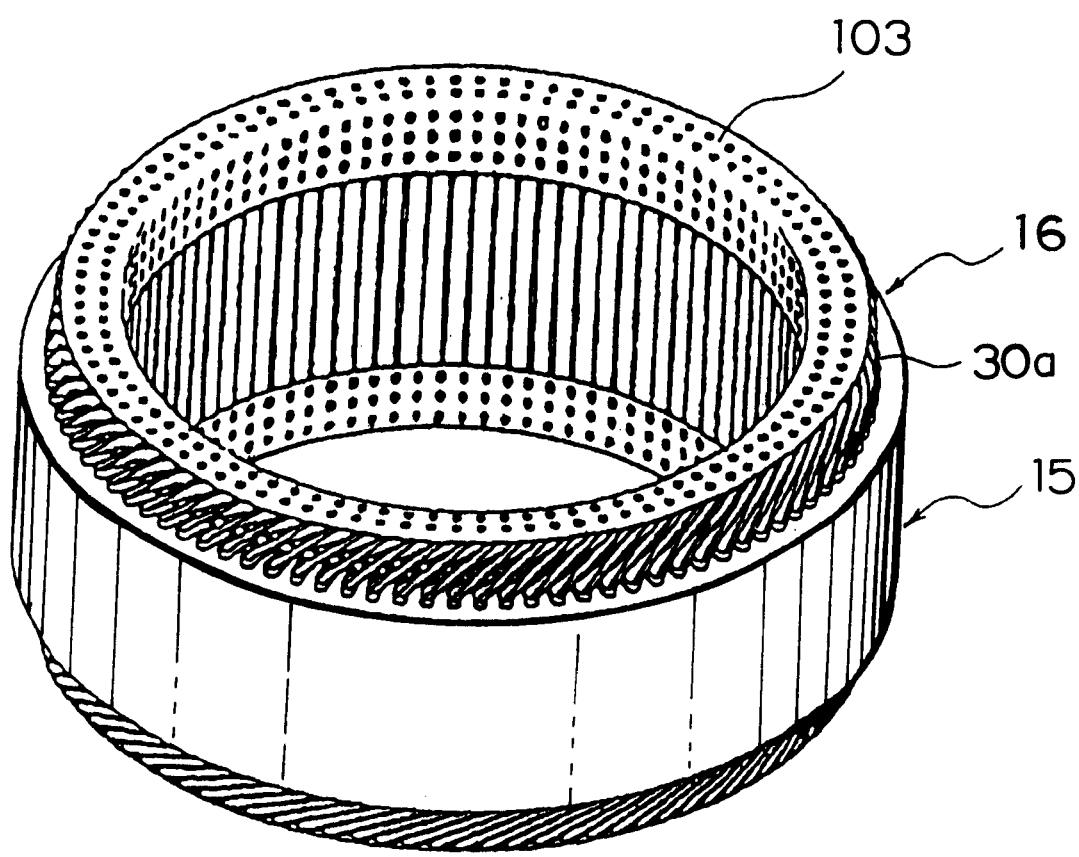
FIG. 20 is a perspective view showing a stator of an automotive alternator according to Embodiment 5 of the present invention.

FIG. 20 is a perspective view showing a stator of an automotive alternator according to Embodiment 5 of the present invention. In the present embodiment shielding plates 103 are provided as planing means at end portions and inner circumference portions of the coil end groups 16*a*, 16*b*. A boundary between the end portion and inner circumference portion of the shielding plate 103 is smoothly connected. A plurality of holes are formed in the shielding plates 103. Other constructions are the same as in Embodiment 2.

In the automotive alternator according to Embodiment 5 structured as above, interference may be further reduced because the shielding plates 103 are provided at end portions and inner circumference portions of the coil end groups 16*a*, 16*b*. Also, since pairs of inner and outer turn portions line up in radial directions without overlapping in an axial direction and the above shielding plates 103 are also provided, the shielding plates 103 guide the cooling air, and cooling air in the radial direction flows to the end portions of the coil ends. Since the outer circumference coil may be air cooled by induction, the cooling air is positively ventilated without any obstructions along the way and cooling performance may be improved. an automotive alternator according to the present invention includes:

a rotor;

a stator including:
    a stator core disposed facing the rotor; and
    a polyphase stator winding installed in the stator core; and a bracket housing and supporting the rotor and the stator;

the stator core formed with a number of slots extending axially at a predetermined pitch in a circumferential direction, the polyphase stator winding including a number of winding portions in which long wire strands are wound so as to alternately occupy an inner layer and an outer layer in a slot depth direction within the slots at intervals of a predetermined number of slots, the wire strands folding back outside the slots at axial end surfaces of the stator core to form turn portions, and a plurality of the wire strands lining up in a row in a radial direction inside the slots of the stator core, the turn portions of the wire strands being roughly the same shape and aligning at roughly the same pitch in a circumferential direction to constitute coil end groups, the coil end groups disposed in a plurality of rows in a radial direction, a fan provided at an axial end portion of the rotor roughly facing the coil end group and generating cooling air flowing in a radial direction to ventilate the coil end group.

Hence, in the polyphase stator winding including a number of winding portions, long wire strands are wound so as to alternately occupy an inner layer and an outer layer in a slot depth direction within the slots at intervals of a predetermined number of slots. Thus, there are no welds, the height of the coil ends may be reduced, copper loss in the coil is reduced and the temperature may be lowered and the output and efficiency increased. Also, interference of the coil ends provided in the cooling air ventilation passages may be lowered and noise may be decreased.

Moreover, pairs of inner and outer turn portions are disposed so as not overlap in the axial direction and line up in rows in radial directions. Thus, axial and circumferential surfaces of the coil having the two-row coil end groups are exposed to cooling air flowing in a radial direction and cooling performance is improved.

Furthermore, the magnetic poles of the rotor are claw-shaped magnetic poles, the fan is provided at an axial end of the claw-shaped magnetic poles, shoulder portions of the claw-shaped magnetic poles are disposed facing the coil end groups and the fan faces the ventilation passage formed at the side of the coil ends away from the stator core. The claw-shaped magnetic poles have an air blowing cooling function similar to that of the fan—blowing air to the coil end groups to cool the coil end groups. The fan faces the ventilation passage for cooling air formed at the side of the coil ends away from the stator core, and since cooling air is ventilated at a high speed in a radial direction inside this ventilation passage, low pressure develops in the ventilation passage and cooling air generated by the shoulder portions of the claw-shaped magnetic poles for cooling the above coil end groups is induced and cooling performance is improved.

Also, cut out portions of a rectilinear or curvilinear cross-section are provided in shoulder portions of claw-shaped magnetic poles and an area of intersection between an outermost outer diameter surface of the rotor and a ridge line of the cut out portions is approximately coincident with an end surface of the stator core. Annular spaces extending in a circumferential direction are formed as a result of forming the cut out portions. These spaces constitute ventilation passages. Thus, the component of cooling air in the circumferential direction increases and cooling performance may thereby be increased. Accordingly, the air cooling function of the shoulder portions of claw-shaped magnetic poles is not inhibited and the cooling performance may be improved. Also, since an outer circumferential corner portion of the end surface of the stator and the ridge line of the cut out portion coincide in the circumferential direction, interference is reduced.

Moreover, cut out portions of a rectilinear or curvilinear cross-section are provided in shoulder portions of claw-shaped magnetic poles and the outer circumference of the fan roughly coincides with an area of intersection between an axial end surface of the claw-shaped magnetic poles and a ridge line of the cut out portions. Annular spaces extending in the circumferential direction are formed outside radial directions of the fans as a result of forming the cut out portions. Momentum is greatest at an outermost diameter-side of a fan and respective cooling air thus has a high speed, resistance at the discharge-side greatly worsens pressure loss. Thus, since the outer circumference of the fan roughly coincides with the area of intersection between an axial end surface of the claw-shaped magnetic poles and the ridge line of the cut out portions, and since the fan faces this space, the ventilation passage is enlarged when the cooling air leaves from the fan, pressure loss is reduced at the discharge-side of the fan and cooling performance is improved. Thus, cooling performance is maintained, and it is possible to reduce noise because the fan may be of a small diameter.

Furthermore, the cut out portions of a rectilinear or curvilinear cross-section are provided in shoulder portions of claw-shaped magnetic poles and the area of intersection between an outermost outer diameter surface of the rotor and a ridge line of the cut out portions is approximately coincident with an end surface of the stator core; and the cut out portions are provided in shoulder portions of claw-shaped magnetic poles and the outer circumference of the fan roughly coincides with an area of intersection between an axial end surface of the claw-shaped magnetic poles and a ridge line of the cut out portions. Thus, annular spaces extending in a circumferential direction are formed as a result of forming the cut out portions. These spaces constitute ventilation passages. Hence, the component of cooling air in the circumferential direction increases and cooling performance may thereby be increased. Accordingly, the air cooling function of the shoulder portions of claw-shaped magnetic poles is not inhibited and the cooling performance may be improved. Also, since an outer circumferential corner portion of the end surface of the stator and the ridge line of the cut out portion coincide in the circumferential direction, interference is reduced. Also, and since the fan faces the above space, the ventilation passage is enlarged when the cooling air leaves from the fan, pressure loss is reduced at the discharge-side of the fan and cooling performance is improved. Thus, cooling performance is maintained, and it is possible to reduce noise because the fan may be of a small diameter.

Also, the fan is provided with blade surfaces thereof inclined toward the cut-out portions. Thus, there is a larger component of cooling air which directly contacts the coil end group via the annular ventilation passage extending in a circumferential direction and formed as a result of the cut out portions and the cooling performance is improved.

Furthermore, the portion inside said bracket facing the fan is a substantially empty space. Since there are no obstructions provided in the space facing the fan, pressure loss is reduced at the discharge-side of the fan and interference is reduced, and cooling air is inducted in the coil end groups and cooling performance is improved.

Moreover, planing means is provided at the inner circumferential portions of the coil end groups. Since the inner circumferential portions of the coil end groups are made a planar surface, it is possible to reduce interference. Also, pairs of inner and outer turn portions are disposed lined up in radial directions and so as to not overlap in an axial direction. The inside of the coil ends is at a low pressure due to planing means which is mounted so as to face the cooling air and a portion of the cooling air flows in from an end portion of the coil end, and air flow is inducted inside the coil ends from the outside and thus the cooling performance may be improved.

Also, planing means is provided at end portions of the coil end groups. Since the end portions of the coil end groups are made a planar surface, it is possible to reduce interference. Moreover, pairs of inner and outer turn portions are disposed lined up in radial directions and so as to not overlap in an axial direction, and because the above planing means is provided, the planing means guides the cooling air. And since the cooling air is positively ventilated without any obstructions along the way, cooling performance may be improved.

Further, planing means is provided at an inner circumferential portions and end portions of the coil end groups. Since the end portions and inner circumferential portions of the coil end groups are made planar surfaces, it is possible to reduce interference. Moreover, pairs of inner and outer turn portions are disposed lined up in radial directions and so as to not overlap in an axial direction, and because the above planing means is provided, the planing means guides the cooling air. And since the cooling air is positively ventilated without any obstructions along the way, cooling performance may be improved.

Furthermore, the portion of the bracket facing the coil end group is a smooth surface and the ventilation passage for cooling air is formed between the smooth surface and coil end group end portion. Since the portion of the bracket facing the coil end group is a smooth surface and the ventilation passage for cooling air is formed between the smooth surface and coil end group end portion, the smooth surface does not obstruct the flow of cooling air. Consequently, cooling air interference due to the bracket is reduced. Further, the flow of the cooling air is rectified by the smooth surface and cooling performance is improved.

What is claimed is:

1. An automotive alternator comprising:

a rotor comprising a plurality of claw-shaped magnetic poles, wherein cut-out portions of a rectilinear or curvilinear cross-sectional shape are provided in shoulder portions of said claw-shaped magnetic poles;

a stator comprising a stator core disposed facing said rotor, and a polyphase stator winding installed in said stator core; and a bracket housing and supporting said rotor and said stator;

said stator core formed with a number of slots extending axially at a predetermined pitch in a circumferential direction, said polyphase stator winding comprising a number of winding portions in which long wire strands are wound so as to alternately occupy an inner layer and an outer layer in a slot depth direction within said slots at intervals of a predetermined number of slots, said wire strands folding back outside said slots at axial end surfaces of said stator core to form turn portions, and a plurality of said wire strands lining up in a row in a radial direction inside said slots of said stator core, said turn portions of said wire strands being roughly the same shape and aligning at roughly the same pitch in a circumferential direction to constitute coil end groups, said coil end groups disposed in a plurality of rows in a radial direction, a fan provided at an axial end of said claw-shaped magnetic poles of said rotor roughly facing said coil end group and generating cooling air flowing in a radial direction to ventilate said coil end group, wherein said fan is provided with blade surfaces which are inclined with respect to an axial direction toward said cut-out portions of said claw-shaped magnetic poles.

2. An automotive alternator according to claim 1 wherein:

said shoulder portions of said claw-shaped magnetic poles are disposed facing said coil end groups, and said fan faces a ventilation passage formed at a side of said coil end group away from said stator core.

3. An automotive alternator according to claim 1 wherein an area of intersection between an outermost outer diameter surface of said rotor and a ridge line of said cut-out portions roughly coincides with an end surface of said stator core.

4. An automotive alternator according to claim 1 wherein:

an area of intersection between an outermost outer diameter surface of said rotor and a ridge line of said cut-out portions roughly coincides with an end surface of said stator core, and an area of intersection between an axial end surface of said claw-shaped magnetic poles and a ridge line of said cut-out portions roughly coincides with an outer diameter of said fan.

5. An automotive alternator according to claim 1 wherein:

a portion inside said bracket facing said fan is a substantially empty space.

6. An automotive alternator according to claim 1 wherein:

planing means is provided at an inner circumferential portion of said coil end group.

7. An automotive alternator according to claim 1 wherein:

planing means is provided at an end portion of said coil end group.

8. An automotive alternator according to claim 1 wherein:

planing means is provided at an inner circumferential portion and end portion of said coil end group.

9. An automotive alternator according to claim 1 wherein:

a portion of said bracket facing said coil end group is a smooth surface and a ventilation passage for cooling air is formed between said smooth surface and coil end group end portions.

* * * * *